(12) United States Patent
Utaki et al.

(10) Patent No.: US 9,732,297 B2
(45) Date of Patent: Aug. 15, 2017

(54) GAS PURIFICATION METHOD

(71) Applicant: Osaka Gas Co., Ltd., Osaka-shi (JP)

(72) Inventors: Takahisa Utaki, Osaka (JP); Shota Kawashima, Osaka (JP); Kenji Seki, Osaka (JP); Yuhei Morita, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 14/777,565

(22) PCT Filed: Mar. 18, 2014

(86) PCT No.: PCT/JP2014/057378
§ 371 (c)(1),
(2) Date: Sep. 16, 2015

(87) PCT Pub. No.: WO2014/148503
PCT Pub. Date: Sep. 25, 2014

(65) Prior Publication Data
US 2016/0272908 A1   Sep. 22, 2016

(30) Foreign Application Priority Data

Mar. 19, 2013   (JP) .................................. 2013-057135

(51) Int. Cl.
*C07C 7/12* (2006.01)
*C07C 7/13* (2006.01)
(Continued)

(52) U.S. Cl.
CPC ............ *C10L 3/101* (2013.01); *B01D 53/047* (2013.01); *B01J 20/20* (2013.01);
(Continued)

(58) Field of Classification Search
CPC .................................... C07C 7/12; C07C 7/13
(Continued)

(56) References Cited

U.S. PATENT DOCUMENTS

| | | | | |
|---|---|---|---|---|
| 4,581,044 A | * | 4/1986 | Uno .................... | B01D 53/047 95/139 |
| 8,262,771 B2 | | 9/2012 | Seki et al. | |
| 8,328,913 B2 | | 12/2012 | Shito et al. | |

FOREIGN PATENT DOCUMENTS

| | | |
|---|---|---|
| EP | 0314040 B1 | 3/1995 |
| JP | 58159830 A | 9/1983 |

(Continued)

OTHER PUBLICATIONS

Office Action re Chinese Patent Application No. 201480016881.4, dated Jun. 30, 2016.
(Continued)

*Primary Examiner* — Thuan D Dang
(74) *Attorney, Agent, or Firm* — The Webb Law Firm

(57) ABSTRACT

The rate of recovery of a purification target gas from a gas purification apparatus that uses a PSA device is improved, and both a high purity and a high recovery rate are achieved with good power efficiency. The present invention is directed to a gas purification method using the PSA method, in which a carbon molecular sieve having a pore volume, at a pore diameter of 0.38 nm or more, of not exceeding 0.05 $cm^3/g$ and a pore volume, at a pore diameter of 0.34 nm, of 0.15 $cm^3/g$ or more, in a pore diameter distribution measured by the MP method is used as an adsorbent, and, in an adsorption step, a miscellaneous gas is adsorbed from a source gas by bringing the source gas into contact with the adsorbent for 10 seconds or more and 6000 seconds or less so as to obtain a concentrated methane.

4 Claims, 10 Drawing Sheets

(51) Int. Cl.
    *C10L 3/10*     (2006.01)
    *B01J 20/20*     (2006.01)
    *B01J 20/28*     (2006.01)
    *B01J 20/34*     (2006.01)
    *B01D 53/047*     (2006.01)
    *C01B 31/08*     (2006.01)

(52) U.S. Cl.
CPC ..... *B01J 20/28004* (2013.01); *B01J 20/2808* (2013.01); *B01J 20/28011* (2013.01); *B01J 20/28069* (2013.01); *B01J 20/28071* (2013.01); *B01J 20/28078* (2013.01); *B01J 20/3416* (2013.01); *B01J 20/3491* (2013.01); *C01B 31/085* (2013.01); *C10L 3/102* (2013.01); *B01D 2253/102* (2013.01); *B01D 2253/108* (2013.01); *B01D 2253/116* (2013.01); *B01D 2256/245* (2013.01); *B01D 2258/05* (2013.01); *C10L 2290/12* (2013.01); *C10L 2290/542* (2013.01)

(58) Field of Classification Search
USPC .................................... 585/823, 824, 825
See application file for complete search history.

(56) References Cited

FOREIGN PATENT DOCUMENTS

| | | |
|---|---|---|
| JP | 6481896 A | 3/1989 |
| JP | 2699 A | 1/1990 |
| JP | 6100309 A | 4/1994 |
| JP | 7316571 A | 12/1995 |
| JP | 1143322 A | 2/1999 |
| JP | 2000312824 A | 11/2000 |
| JP | 200319415 A | 1/2003 |
| JP | 200683311 A | 3/2006 |
| WO | 2008053680 A1 | 5/2008 |
| WO | 2008053681 A1 | 5/2008 |

OTHER PUBLICATIONS

Chen et al., "Colloid Chemistry", 1985, Higher Education Press, Beijing, China, pp. 107-110.
Shen, New-Type Carbon Materials, Chemical Industry Press, and Material Science and Engineering Publishing center, 2003, Section 7.4, pp. 318-321.

* cited by examiner

Equilibrium adsorption curves for adsorbent C

GAS PURIFICATION METHOD

CROSS-REFERENCE TO RELATED APPLICATIONS

This application is the United States national phase of International Application No. PCT/JP2014/057378 filed Mar. 18, 2014 and claims priority to Japanese Patent Application No. 2013-057135 filed Mar. 19, 2013, the disclosures of which are hereby incorporated in their entirety by reference.

TECHNICAL FIELD

The present invention relates to a gas purification method including:

providing an adsorption tower filled with an adsorbent that adsorbs a miscellaneous gas other than methane from a source gas containing methane;

providing a source gas supply line for supplying the source gas to the adsorption tower;

providing a product gas recovery line for discharging methane that has not been adsorbed on the adsorbent as a product gas;

providing a miscellaneous gas discharge line for discharging desorbed miscellaneous gas that has been adsorbed on the adsorbent; and alternately performing, with the adsorption tower, the source gas supply line, the product gas recovery line, and the miscellaneous gas discharge line, an adsorption step of receiving the source gas into the adsorption tower from the source gas supply line, adsorbing the miscellaneous gas onto the adsorbent, and recovering the product gas into the product gas recovery line, and a desorption step of depressurizing-desorbing the miscellaneous gas adsorbed on the adsorbent and discharging that miscellaneous gas from the miscellaneous gas discharge line in a state in which the source gas supply line and the product gas recovery line are closed.

BACKGROUND ART

In the case of effectively using a flammable gas, it is necessary to separate a gas such as the air from a source gas containing the flammable gas, and concentrate the flammable gas into an appropriate concentration range. Various such apparatuses and methods for concentrating a flammable gas have been proposed, and inventions have been proposed in which a so-called coal mine gas as a flammable gas is used as a source gas, the air (mainly containing nitrogen, oxygen, and carbon dioxide) is separated from the source gas by using an adsorbent, and methane is concentrated for use.

That is, with the use of natural zeolite, which has a very slower adsorption rate for methane than for nitrogen, as an adsorbent (i.e., with the use of an adsorbent that preferentially adsorbs nitrogen, oxygen, and carbon dioxide to methane), a coal mine gas is introduced into an adsorption tower filled with the adsorbent by a compressor or the like until a predetermined pressure is reached. Consequently, oxygen, nitrogen, and carbon dioxide that are contained in the coal mine gas are adsorbed first at the front portion (lower portion) of the adsorption tower, and methane, for which the adsorption rate is slow, is adsorbed at the back portion (upper portion) of the adsorption tower. Furthermore, inventions of apparatuses and methods for concentrating methane have been proposed in which the above-described methane is further released from the upper portion of the adsorption tower until atmospheric pressure is reached.

Thereby, the air can be separated from the coal mine gas as the source gas by using the adsorbent, methane can be concentrated, and the concentrated methane can be used as a fuel or the like. It is thought that the coal mine gas containing a relatively high concentration of methane can be similarly used.

That is, a configuration (hereinafter referred to as "PSA (Pressure Swing Adsorption) device") is envisaged that includes:

an adsorption tower filled with an adsorbent that adsorbs a miscellaneous gas other than a purification target gas from a source gas;

a source gas supply line for supplying the source gas to the adsorption tower;

a product gas recovery line for discharging the purification target gas that has not been adsorbed on the adsorbent as a product gas; and a miscellaneous gas discharge line for discharging desorbed miscellaneous gas that has been adsorbed on the adsorbent, the adsorption tower, the source gas supply line, the product gas recovery line, and the miscellaneous gas discharge line being connected so as to be able to perform a pressure swing operation of alternately performing an adsorption step of receiving the source gas from the source gas supply line, adsorbing the miscellaneous gas onto the adsorbent, and recovering the product gas, and a desorption step of desorbing the miscellaneous gas adsorbed on the adsorbent and discharging that miscellaneous gas from the miscellaneous gas discharge line.

Thereby, when the source gas is supplied to the adsorption tower from the source gas supply line, the adsorption step of adsorbing the miscellaneous gas in the source gas onto the adsorbent in the adsorption tower can be performed. The purification target gas in the source gas that has not been adsorbed on the adsorbent is recovered from the product gas recovery line, and the adsorption tower that has been saturated by adsorbing the miscellaneous gas can be regenerated by performing the desorption step of depressurizing-desorbing the miscellaneous gas adsorbed on the adsorbent. The exhaust gas generated at this time is composed mainly of the miscellaneous gas, and is discharged from the miscellaneous gas discharge line. A pressure swing operation of repeating the adsorption step and the desorption step can be performed.

Here, in the case of concentrating methane contained in a biogas or a coal mine gas, an adsorbent having a large adsorption capacity for the miscellaneous gas in the source gas and also having a high methane/miscellaneous gas separation property are desired as the adsorbent. However, not so many adsorbents having a large adsorption capacity for the miscellaneous gas in the source gas and also having a high methane/miscellaneous gas separation property are known. For example, Patent Documents 1 to 5 state that carbon molecular sieves having an average pore diameter of about 3 Å to 5 Å are suitably used for adsorptive separation of methane from various gases (see, e.g., Patent Documents 1 to 5).

However, it has been revealed that, in addition to the pore diameter, the distribution of pore volumes and the adsorption time constant contribute to the miscellaneous gas separation performance (see, e.g., Patent Documents 6 to 9), and there is a need to select an appropriate adsorbent in accordance with the purpose of the pressure swing operation.

PRIOR ART DOCUMENTS

Patent Documents

Patent Document 1: JP S58-159830A
Patent Document 2: JP H02-000699A
Patent Document 3: JP H07-316571A
Patent Document 4: JP 2003-019415A
Patent Document 5: JP 2006-083311A
Patent Document 6: WO 2008/053680
Patent Document 7: WO 2008/053681
Patent Document 8: JP H01-081896A
Patent Document 9: JP 2000-312824A

DISCLOSURE OF THE INVENTION

Problem to be Solved by the Invention

Furthermore, with the technique according to Patent Document 2 above, the product gas can be set to a high purity because the purity of the product gas can be determined by the PSA device. However, the membrane separator, which is used to increase in advance the purity of the source gas supplied to the PSA device, causes a large reduction in the recovery rate of the purification target gas, and as a result, the technique is unlikely to contribute to the increase in the recovery rate of the apparatus as a whole.

Therefore, it is an object of the present invention to improve the recovery rate of a product from a gas purification apparatus that uses a PSA device, thereby achieving both a high purity and a high recovery rate with good power efficiency.

Means for Solving Problem (Configuration 1)
In order to achieve the above-described object, a characteristic feature of a gas purification method according to the present invention is directed to a gas purification method including:
providing an adsorption tower filled with an adsorbent that adsorbs a miscellaneous gas other than methane from a source gas containing methane;
providing a source gas supply line for supplying the source gas to the adsorption tower;
providing a product gas recovery line for discharging methane that has not been adsorbed on the adsorbent as a product gas;
providing a miscellaneous gas discharge line for discharging desorbed miscellaneous gas that has been adsorbed on the adsorbent; and
alternately performing, with the adsorption tower, the source gas supply line, the product gas recovery line, and the miscellaneous gas discharge line,
an adsorption step of receiving the source gas into the adsorption tower from the source gas supply line, adsorbing the miscellaneous gas onto the adsorbent, and recovering the product gas into the product gas recovery line, and
a desorption step of depressurizing-desorbing the miscellaneous gas adsorbed on the adsorbent and discharging that miscellaneous gas from the miscellaneous gas discharge line in a state in which the source gas supply line and the product gas recovery line are closed,
wherein a carbon molecular sieve having
a pore volume ($V_{0.38}$), at a pore diameter of 0.38 nm or more, of not exceeding 0.05 cm$^3$/g and
a pore volume ($V_{0.34}$), at a pore diameter of 0.34 nm, of 0.15 cm$^3$/g or more, in a pore diameter distribution measured by the MP method is used as the adsorbent, and,
in the adsorption step, the miscellaneous gas is adsorbed from the source gas by bringing the source gas into contact with the adsorbent for 10 seconds or more and 6000 seconds or less so as to obtain a concentrated methane.

(Operation and Effect 1)
As a result of extensive studies on the types and physical properties of the adsorbents in performing the above-described gas purification method, the present inventors have found that a carbon molecular sieve having a pore volume ($V_{0.38}$), at a pore diameter of 0.38 nm or more, of not exceeding 0.05 cm$^3$/g and a pore volume ($V_{0.34}$), at a pore diameter of 0.34 nm, of 0.15 cm$^3$/g or more, which is usually used for air separation, can be preferably used as the above-described adsorbent for the methane purification by separation.

That is, although such a carbon molecular sieve has been used for air separation (purifying the air by separating it into nitrogen and oxygen) because of its excellent capability of separating oxygen and nitrogen in the air, the inventors have newly found that, unexpectedly, the carbon molecular sieve can be suitably used for separation of oxygen, nitrogen, and methane by adjusting its adsorptive separation cycle, and completed the present invention.

The above-described adsorbent is usually used for air separation because it exerts the properties of adsorbing oxygen in a gas contact time of about 6 seconds to 60 seconds, while not adsorbing nitrogen. However, the inventors have found that an appropriate adsorptive separation time in which this adsorbent adsorbs oxygen, carbon dioxide, and nitrogen in the air and does not adsorb methane can be set by bringing the adsorbent into contact with a gas for a longer period of time. Although this adsorptive separation time varies depending on the type of the gas in coexistence with methane, its preferable range is 10 seconds or more and 6000 seconds or less, and bringing the adsorbent into contact with the source gas for a long time makes it possible to form a gas separatable period of time until the adsorbent begins to adsorb methane after it adsorbs oxygen, carbon dioxide, and nitrogen in the air.

Accordingly, it has been found that a contact time of about 1 minute to 100 minutes enables nitrogen/methane separation, and a contact time of about 6 seconds to 100 minutes allows the separation of oxygen and carbon dioxide from methane to be performed with high precision.

(Configuration 2)
Further, the adsorbent can have a pore volume ($V_{0.38}$), at a pore diameter of 0.38 nm or more, of not exceeding 0.01 cm$^3$/g and a pore volume ($V_{0.34}$), at a pore diameter of 0.34 nm, of 0.20 cm$^3$/g or more.

(Operation and Effect 2)
With regard to the physical properties of the adsorbent, the molecular diameter of a separable gas tends to be determined by a pore diameter, and the adsorption capacity for the gas corresponding to the pore diameter tends to be determined by the pore volume at that pore diameter. Therefore, more precisely, when the adsorption capacity is very large at a pore diameter of 0.34 nm, which corresponds to the molecular diameter of nitrogen, and the adsorption capacity is very small at a pore diameter of 0.38 nm or more, which corresponds to the molecular diameter of methane, a larger gas separation ratio can be achieved.

(Configuration 3)

Further, the adsorbent may have a particle diameter of 0.5 mmφ to 3.0 mmφ, and a packing density of the adsorbent for the adsorption tower may be 0.60 g/mL to 0.75 g/mL.

(Operation and Effect 3)

In the case of performing the gas purification method under the above-described conditions, the higher the gas contact efficiency for the adsorbent, the higher the gas adsorptive separation efficiency can be set. As for the gas contact efficiency for the adsorbent, a certain large amount of a gap needs to be ensured between adsorbents. The amount of the gap can be appropriately set based on the relationship between the particle diameter of the adsorbent and the packing density of the adsorbent for the adsorption tower. Here, it has been revealed that when the particle diameter of the adsorbent is 0.5 mmφ to 3.0 mmφ, and the packing density of the adsorbent for the adsorption tower is 0.60 g/mL to 0.75 g/mL, a particularly high gas contact efficiency can be set for the adsorbent.

Note that it is needless to say that when the particle diameter of an adsorbent is changed, an appropriate packing density can be set for the adsorbent.

(Configuration 4)

Further, the above-described gas purification method includes:

prior to performing that gas purification method, using a low-concentration methane-containing gas having a methane concentration of less than 50% as an upstream source gas;

providing an upstream adsorption tower filled with a methane adsorbent that adsorbs methane from the upstream source gas;

providing an upstream source gas supply line for supplying the upstream source gas to the upstream adsorption tower;

providing an upstream miscellaneous gas discharge line for discharging an upstream miscellaneous gas that has not been adsorbed on the methane adsorbent;

providing an upstream gas recovery line for recovering desorbed methane that has been adsorbed on the methane adsorbent; and alternately performing, with the upstream adsorption tower, the upstream source gas supply line, the upstream miscellaneous gas discharge line, and the upstream gas recovery line, an upstream adsorption step of receiving the upstream source gas from the upstream source gas supply line, adsorbing methane onto the methane adsorbent, and discharging the upstream miscellaneous gas that has not been adsorbed on the methane adsorbent; and an upstream desorption step of desorbing methane adsorbed on the methane adsorbent and recovering that methane from the upstream gas recovery line, with the upstream source gas supply line and the upstream miscellaneous gas discharge line being closed, thereby obtaining a gas recovered from the upstream gas recovery line as a source gas having a methane concentration of 50% or more.

(Operation and Effect 4)

By increasing the methane concentration by using a device intended to adsorb methane, such as a PSA, prior to performing the above-described gas purification method, it is possible to recover a high-concentration methane in a very efficient manner. In the case of performing the adsorption by a single stage using the adsorbent that adsorbs a miscellaneous gas other than methane when the source gas has a low concentration, a large amount of the miscellaneous gas other than methane is adsorbed on the adsorbent. Accordingly, the amount of the product methane for washing the adsorbent is increased, as a result of which the recovery rate is reduced. To avoid this, it is preferable to perform the adsorption in two stages by providing a device intended to adsorb methane, such as a PSA, on the upstream side.

That is, as the device intended to adsorb methane, such as a PSA, it is possible to adopt a configuration in which:

a low-concentration methane-containing gas having a methane concentration of less than 50% is used as an upstream source gas;

an upstream adsorption tower filled with a methane adsorbent that adsorbs methane from the upstream source gas is provided;

an upstream source gas supply line for supplying the upstream source gas to the upstream adsorption tower is provided;

an upstream miscellaneous gas discharge line for discharging an upstream miscellaneous gas that has not been adsorbed on the methane adsorbent is provided; and an upstream gas recovery line for recovering desorbed methane that has been adsorbed on the methane adsorbent is provided.

Such a device can obtain a source gas having a methane concentration of 50% or more, and can be easily applied to the gas purification method according to the present invention.

Note that in such a case, known configurations can be applied as appropriate to the material of the methane adsorbent, the configuration of the adsorption tower, and the like.

Advantageous Effects of Invention

Accordingly, it is possible to recover methane having a higher purity, and to effectively use a coal mine gas, a biogas and the like that have been conventionally difficult to reuse, with a high recovery rate of methane.

BEST MODE FOR CARRYING OUT THE INVENTION

Hereinafter, a gas purification method and an apparatus for performing the method according to an embodiment of the present invention will be described. Although preferred embodiments will be described below, each of these embodiments is described for more specifically illustrating the present invention. Various modifications may be made without departing from the scope and spirit of the invention, and the present invention is not limited to the following description.

(Gas Purification Apparatus)

Figure 1:
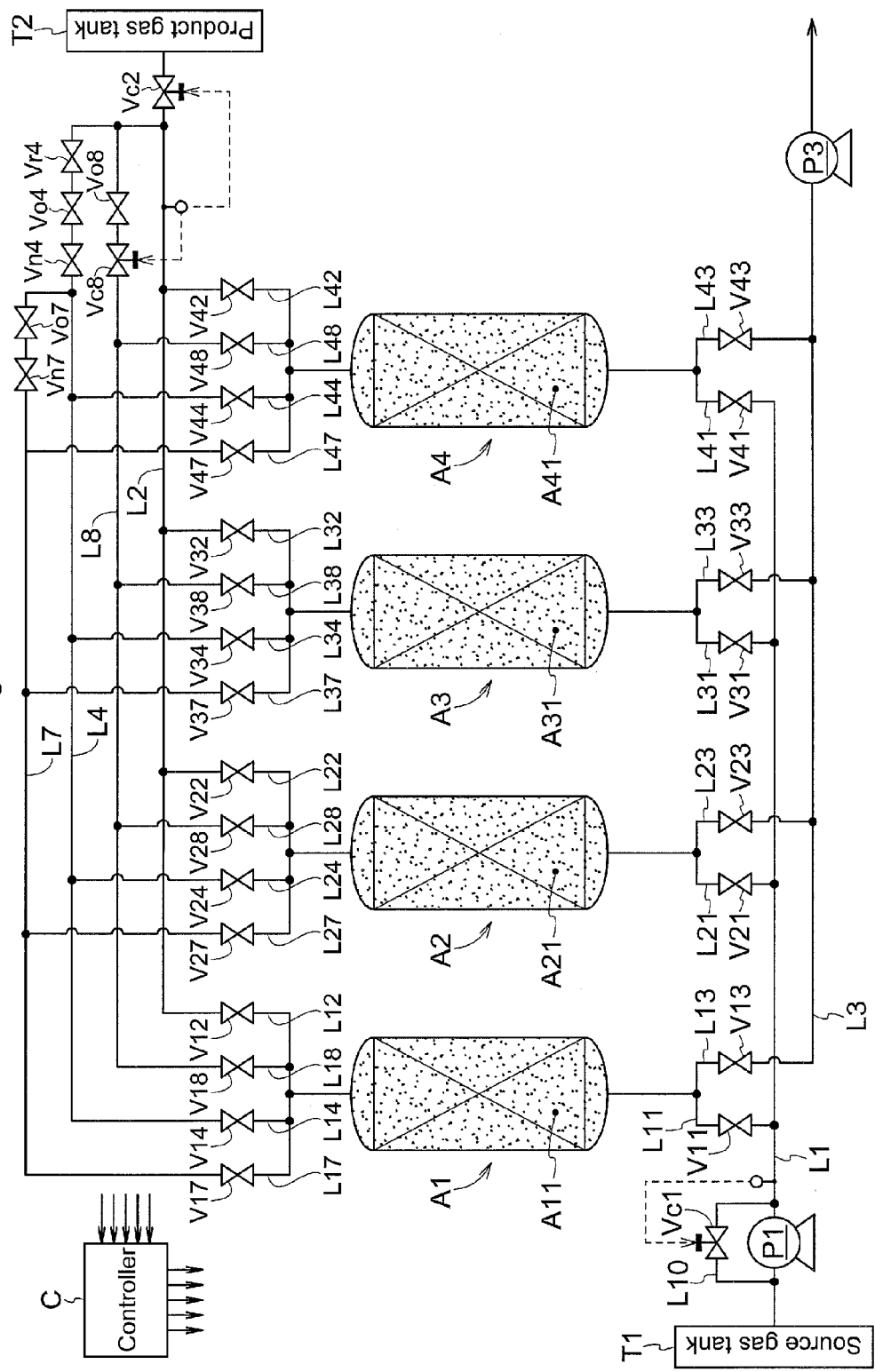
FIG. 1 is a schematic diagram of a gas purification apparatus.

As shown in FIG. 1, a gas purification apparatus includes adsorption towers A1 to A4 that are filled with adsorbents A11 to A41. Each adsorption tower is provided with a source gas supply line L1 from a source gas tank T1, a product gas recovery line L2 and a product gas tank T2 for recovering, as a product gas, methane as a purification target gas that has not been adsorbed on the adsorbents A11 to A41, and a miscellaneous gas discharge line L3 for discharging desorbed miscellaneous gas that has been adsorbed on the adsorbents A11 to A41.

The supply of gas from the source gas tank T1 to the source gas supply line L1 is carried out using a supply pump P1, and a bypass line L10 that bypasses the supply pump P1 is provided with a pressure control valve Vc1 so as to be able to stably control the pressure at the time of increasing the pressure in the adsorption towers A1 to A4. The source gas supplied to the source gas supply line L1 is supplied to the adsorption towers A1 to A4 via supply lines L11 to L41 including switching valves V11 to V41.

The product gas discharged from the adsorption towers A1 to A4 flow into a product gas recovery line L2 through recovery lines L12 to L42 including switching valves V12 to V42. A pressure control valve Vc2 is provided in the product gas recovery line L2. By using the pressure control valve Vc2 to control the pressure of the product gas recovered from the adsorption towers A1 to A4 into the product gas tank T2, the pressure of recovery of the product gas from the adsorption towers A1 to A4 can be controlled based on the relationship with the pressure of supply of the source gas in the adsorption towers A1 to A4.

The miscellaneous gas adsorbed in the adsorption towers A1 to A4 is desorbed from the adsorbents A11 to A41 by being decompressed, and is discharged from the miscellaneous gas discharge line L3 through exhaust gas lines L13 to L43 including switching valves V13 to V43.

In the product gas recovery line L2, a product gas washing line L4 for flowing the product gas as a washing gas into the adsorption towers A1 to A4 from the product gas tank T2 is provided on the upstream side (the adsorption towers A1 to A4 side) with respect to the pressure control valve Vc2. That is, the washing gas flows into the product gas washing line L4 from the product gas tank T2, and is supplied to the adsorption towers through washing lines L14 to L44 including switching valves V14 to V44. Also, the gas in the adsorption towers A1 to A4 is replaced with the product gas, and discharged as the miscellaneous gas from the miscellaneous gas discharge line L3 through exhaust gas lines L13 to L43 including switching valves V13 to V43. Furthermore, a pressure reducing valve Vr4, an open/close valve Vo4, and a needle valve Vn4 are provided between the product gas recovery line L2 and the adsorption towers A1 to A4 in the product gas washing line L4. This allows the product gas from the product gas tank T2 to flow as a washing gas into the adsorption towers A1 to A4 from the gas washing line L4 via the washing lines L14 to L44 including the switching valves V14 to V44, thus performing the operation of washing the adsorption towers A1 to A4. Accordingly, the pressure for washing the adsorption towers A1 to A4 is controlled with the pressure reducing valve Vr4, and is adjusted with the needle valve Vn4 so as to prevent a rapid pressure change, and is easily switched by the open/close valve Vo4.

Further, an inter-tower pressure equalization line L7 is provided for the adsorption towers A1 to A4 such that the gas discharged from the upper portion of the adsorption towers A1 to A4 during pressure equalization (depressurizing) steps can be transferred via the product gas washing line L4 to the upper portion of the adsorption towers A1 to A4 in which pressure equalization (pressurizing) steps are performed. That is, the gas discharged from the upper portion of the adsorption towers A1 to A4 in the pressure equalization (depressurizing) steps flows into the inter-tower pressure equalization line L7 via pressure equalization lines L17 to L47 including switching valves V17 to V47, and flows via the washing lines L14 to L44 including the switching valves V14 to V44 into the adsorption towers A1 to A4 in which the pressure equalization (pressurizing) steps are performed. A needle valve Vn7 and an open/close valve Vo7 are provided in the inter-tower pressure equalization line L7, and thereby, the gas discharged from the upper portion of each adsorption tower via the corresponding pressure equalization line at this time is gradually transferred via the needle valve Vn7, and flows into a different one of the adsorption towers A1 to A4 via the product gas washing line L4.

Further, a product gas pressurizing line L8 for supplying a product gas as a gas for increasing the pressure inside the adsorption towers A1 to A4 is provided for the adsorption towers A1 to A4. That is, in the pressurizing step, the product gas supplied from the product gas tank T2 flows into the adsorption towers from the product gas pressurizing line L8 via pressurizing lines L18 to L48 including switching valves V18 to V48. An open/close valve Vo8 and a pressure control valve Vc8 is provided in the product gas pressurizing line L8, and the pressure in the adsorption towers A1 to A4 can be increased by transferring the product gas into the adsorption towers based on the retaining pressure of the product gas tank T2 at this time.

Further, a controller C is provided in the gas purification apparatus. The controller C controls the opening and closing of the switching valves V11 to V48 and the like provided in the adsorption towers A1 to A4, and the piping of the source gas supply line L1, the product gas recovery line L2, the miscellaneous gas discharge line L3, the product gas washing line L4, the inter-tower pressure equalization line L7, and the product gas pressurizing line L8. Accordingly, the controller C serves as an adsorption/desorption controller that performs the adsorption steps in the adsorption towers A1 to A4 by using the supply pump P1, and also functions as a washing controller for washing the adsorption towers A1 to A4 by flowing the product gas into the adsorption towers A1 to A4 from the product gas tank T2.

Note that as the adsorbents A11 to A41 here, an adsorbent capable of selectively adsorbing a miscellaneous gas other than methane in the source gas is preferably used. As such an adsorbent, an adsorbent composed mainly of at least one material selected from the group consisting of an activated carbon, a molecular sieve carbon, zeolite, and a porous metal complex is used.

The adsorbents A11 to A41 have a particle diameter of 0.5 mmϕ to 3.0 mmϕ, and have a packing density to the adsorption towers A1 to A4 of 0.60 g/mL to 0.75 g/mL.

Specifically, it is also possible to use, for example, a molecular sieve carbon having a pore volume ($V_{0.38}$), at a pore diameter of 0.38 nm or more, of not exceeding 0.01 cm$^3$/g and a pore volume ($V_{0.34}$), at a pore diameter of 0.34 nm, of 0.20 cm$^3$/g or more, as measured by the MP method.

Figure 4:
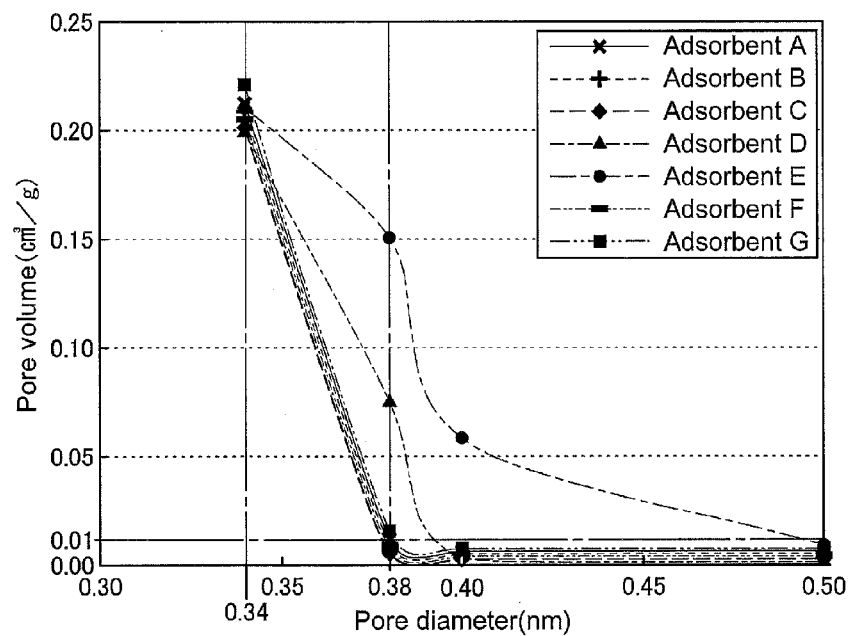
FIG. 4 is a graph showing pore diameter distributions of adsorbents.

Note that as shown in FIG. 4, in the present embodiment, a carbon molecular sieve having
a pore volume ($V_{0.38}$), at a pore diameter of 0.38 nm or more, of not exceeding 0.05 cm$^3$/g and a pore volume ($V_{0.34}$), at a pore diameter of 0.34 nm, of 0.15 cm$^3$/g or more in the pore diameter distribution measured by the MP method is used as the adsorbents A11 to A41.

Examples of the adsorbents A11 to A41 that satisfy the conditions include the adsorbents A to C, F, and G shown in FIG. 4.

In FIG. 4, the adsorbents A to C, F, and G have a pore volume ($V_{0.38}$), at a pore diameter of 0.38 nm or more, of not exceeding 0.05 cm$^3$/g and a pore volume ($V_{0.34}$), at a pore diameter of 0.34 nm, of 0.15 cm$^3$/g or more, and thus have a low adsorption capability for methane and require a very long time to exert the methane adsorption capability. In contrast, it has been revealed that the adsorbents D and E have a large pore volume at a pore diameter of 0.38 nm and exert the methane adsorption capability in a relatively short time, and therefore are not suitable for methane separation.

Figure 5:
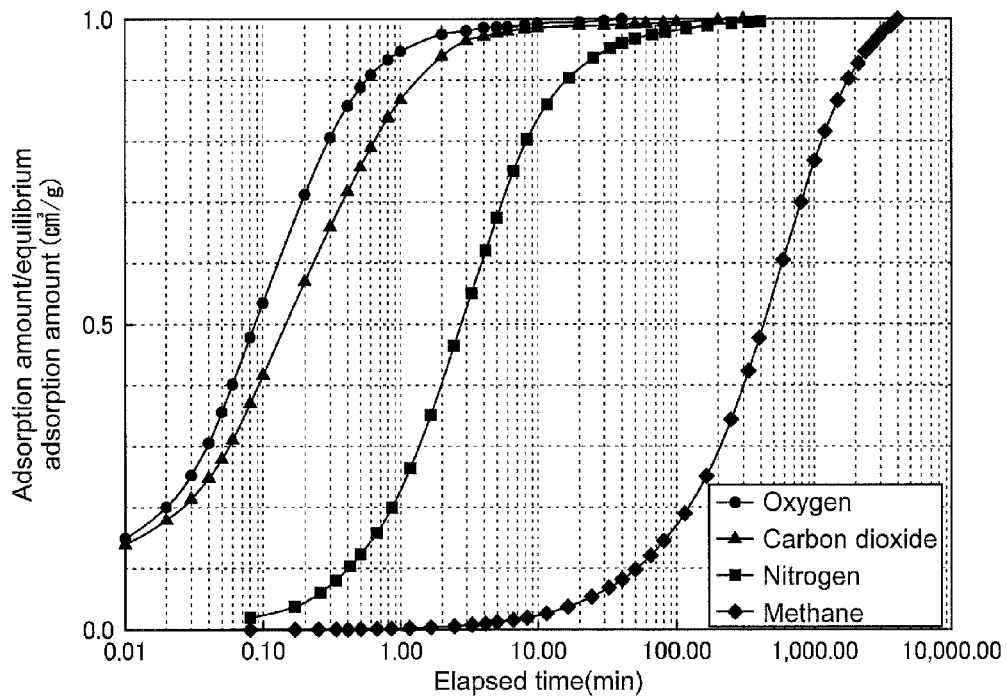
FIG. 5 is a graph showing equilibrium adsorption amounts in an adsorbent.

As a result of determining the equilibrium adsorption amounts for various gases (oxygen, carbon dioxide, nitrogen, methane) of these adsorbents, the adsorption amounts for oxygen and carbon dioxide significantly increase after an elapse of about 0.1 minute (e.g., about 6 seconds to 10 seconds), and the adsorption amount for nitrogen significantly increases after an elapse of about 1 minute (60 seconds) to 10 minutes (600 seconds), as representatively shown in FIG. 5 for the adsorbent C. In contrast, the adsorption amount for methane significantly increases after an elapse of about 100 minutes (6000 seconds), and therefore, it is possible to separate and remove oxygen, nitrogen, and carbon dioxide from methane.

Figure 6:
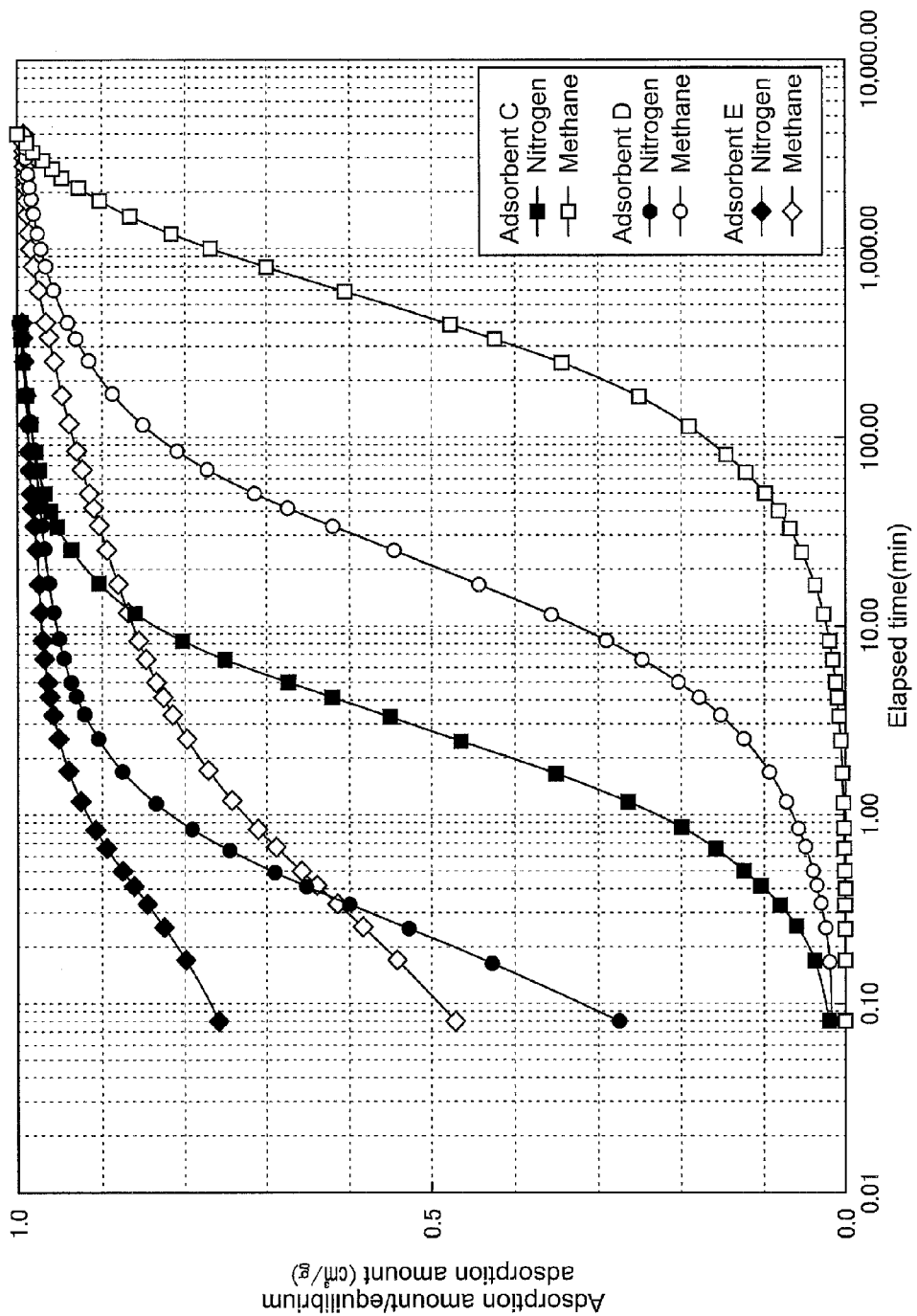
FIG. 6 is a graph showing equilibrium adsorption amounts in adsorbents.

Here, FIG. 6 shows the equilibrium adsorption curves for nitrogen and methane in the adsorbents C, D, and E.

As shown in FIGS. 5 and 6, in the adsorbent C, the methane adsorption amount at the point in time (about 289 minutes) at which the nitrogen adsorption amount has reached equilibrium is about 40% of the equilibrium adsorption amount. In contrast, as shown in FIG. 6, in the adsorbent D, the methane adsorption amount at the point in time (about 15 minutes) at which the nitrogen adsorption amount has reached equilibrium reaches about 92% of the equilibrium adsorption amount. Also, in the adsorbent E, the methane adsorption amount at the point in time at which the nitrogen adsorption amount has reached equilibrium reaches about 96% of the equilibrium adsorption amount.

That is, it can be seen that in the adsorbent C, there is a significant difference between the time at which the adsorption of the miscellaneous gas mainly occurs and the time at which the adsorption of methane mainly occurs, and therefore, it takes a very long time for the methane adsorption capability to be exerted, whereas in the adsorbents D and E, there is a small difference between these two times, and thus the methane adsorption capability is exerted in a relatively short time.

In view of these, at the time of performing the adsorption step with the adsorption towers A1 to A4 filled with the adsorbent C, bringing the source gas into contact with the adsorbent C for 10 seconds or more and 6000 seconds or less makes it possible to favorably adsorb the miscellaneous gas (oxygen, nitrogen, carbon dioxide) from the coal mine gas to separate methane favorably. Note that it is preferable that the same contact time is also set for the adsorbents A, B, F, and G other than the adsorbent C.

Further, as shown in FIGS. 5 and 6, a comparison between, for example, the time (about 289 minutes) required for the methane adsorption amount in the adsorbent C to reach about 40% of the equilibrium adsorption amount and the time (about 15 minutes) required for the methane adsorption amount in the adsorbent D to reach about 40% of the equilibrium adsorption amount shows that it takes much longer time in the adsorbent C.

Furthermore, in the time period (e.g., the time period of about 0 minutes or more and 289 minutes or less in which the methane adsorption amount is about 0% to 40%) in which the methane adsorption amount in the adsorbent C is relatively small, the difference value between the nitrogen adsorption amount and the methane adsorption amount is relatively large. In the time period (the time period of about 0 minutes or more and 15 minutes or less in which the methane adsorption amount is about 0% to 40%) in which the methane adsorption amount in the adsorbent D is relatively small, the difference value between the nitrogen adsorption amount and the methane adsorption amount is relatively small.

Accordingly, in the adsorbent C, a longer time can be ensured for the adsorption step than in the adsorbent D, making it possible to increase the methane processing amount, and to improve the performance of separating methane from the source gas.

From such a viewpoint, in the adsorbent C, the time for which the source gas is brought into contact with the adsorbent C in the adsorption step is preferably set to about 600 second or more and 6000 seconds or less. With such a setting, it is possible to set the time that is before the nitrogen adsorption amount in the adsorbent C reaches the equilibrium adsorption amount (about 6000 seconds or less), and that allows the source gas processing amount and the methane separation performance to be improved (about 600 seconds or more) while ensuring the time for the adsorption step as long as possible.

(Adsorption Towers)

The adsorption towers A1 to A4 are filled with the adsorbents A11 to A41, respectively. Below the adsorption towers A1 to A4, the supply lines L11 to L41 for supplying a coal mine gas from the source gas tank T1 by the supply pump P1 are provided to form the source gas supply line L1. Above the adsorption towers A1 to A4, the recovery lines L12 to L42 for recovering methane as the purification target gas that has not been adsorbed on the adsorbents A11 to A41 from the coal mine gas supplied to the adsorption towers A1 to A4 are provided to form the product gas recovery line L2. This provides a configuration capable of supplying the coal mine gas from the source gas supply line L1 to the adsorption towers A1 to A4, and discharging any methane that has not been adsorbed on the adsorbents A11 to A41 from the product gas recovery line L2, thus adsorbing the miscellaneous gas onto the adsorbents A11 to A41 and separating the miscellaneous gas from methane. Further, in the adsorption towers A1 to A4, the exhaust gas lines L13 to L43 for discharging the miscellaneous gas adsorbed on the adsorbents A11 to A41 are provided below the adsorption towers A1 to A4 to form the miscellaneous gas discharge line L3, providing a configuration capable of collecting, from the coal mine gas supplied to the source gas supply line L1, the miscellaneous gas other than methane that has been adsorbed on the adsorbents A11 to A41.

Note that switching valves V11 to V48 are provided in the supply lines L11 to L48, thus providing a configuration that enables the controller C to perform overall control of the switching between supply, discharge, and suspension of the gas to the adsorption towers A1 to A4 by the operation of the pumps P1 and P3.

(Methane Concentration Method)

Figure 2:
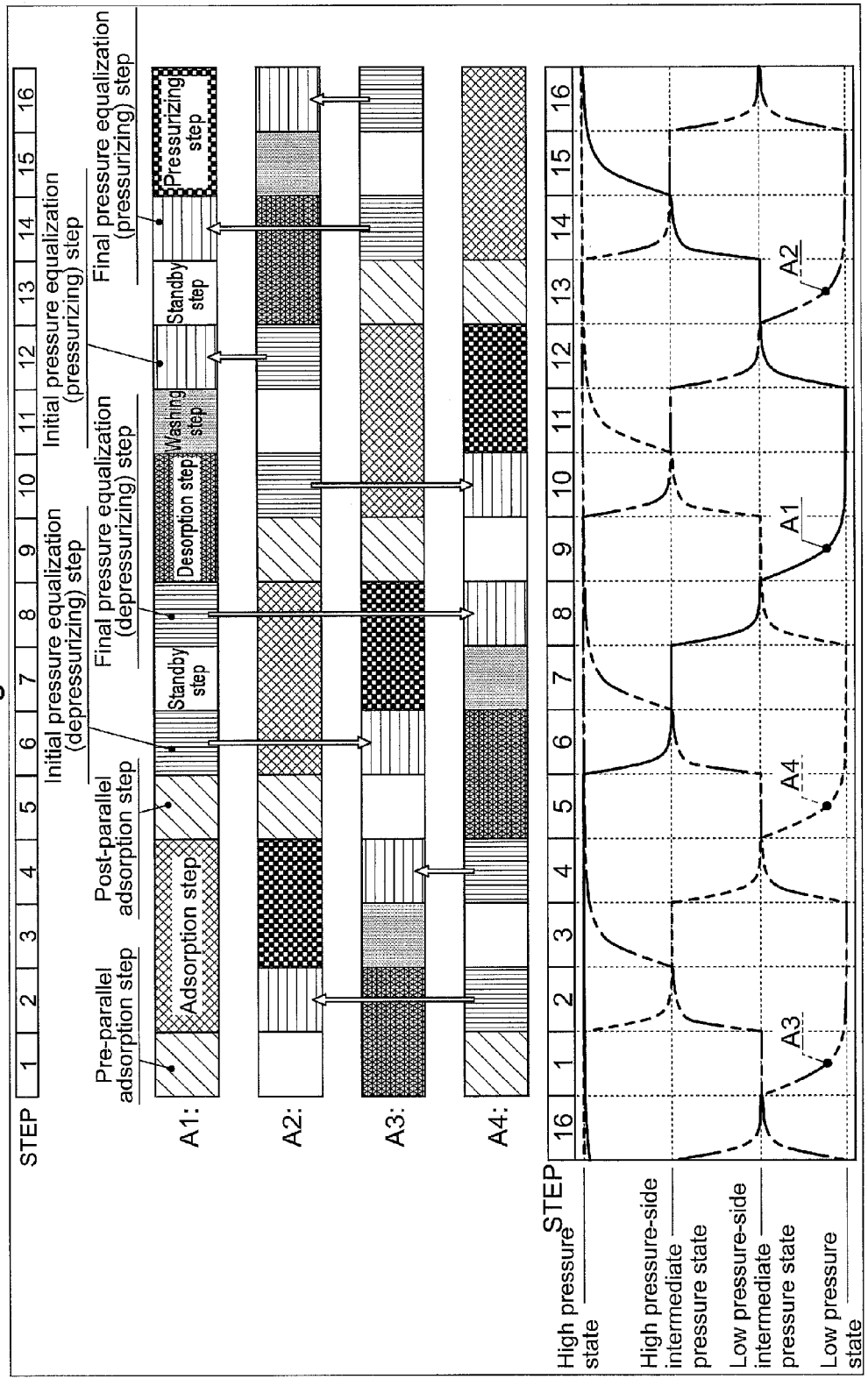
FIG. 2 is a step diagram showing a methane concentration method.
Figure 3:
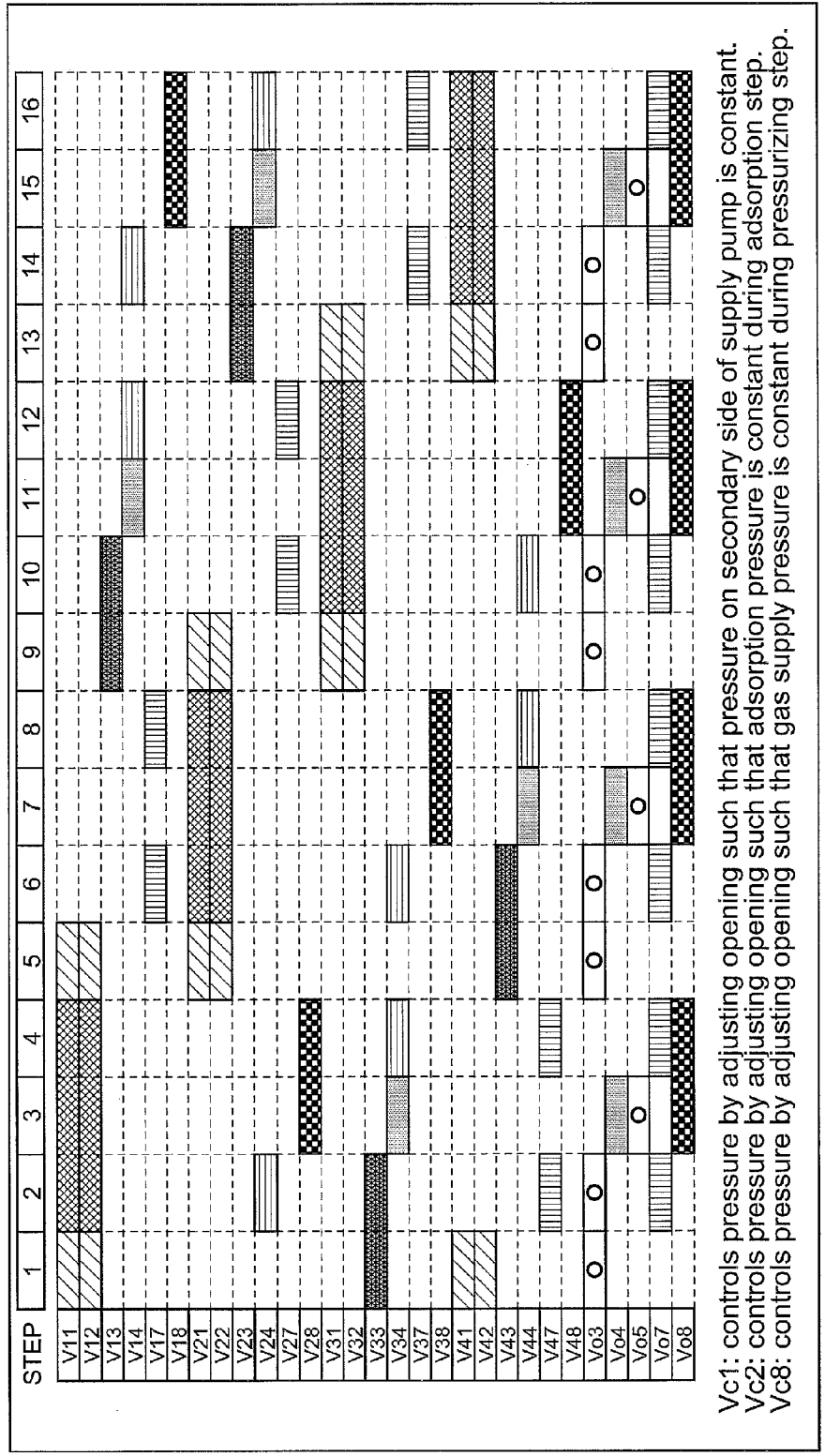
FIG. 3 is a diagram illustrating a gas flow operation in the case of performing the methane concentration method of FIG. 2.

As shown in FIGS. 2 and 3, in the adsorption towers A1 to A4, the controller C controls the switching valves V11 to V45 and the pumps P1 and P3 to:

provide an adsorption tower filled with an adsorbent that adsorbs a miscellaneous gas composed mainly of the air from a source gas containing methane concentration of 40% or more and 70% or less;

provide a source gas supply line for supplying the source gas to the adsorption tower;

provide a product gas recovery line for discharging methane that has not been adsorbed on the adsorbent as a product gas;

provide a miscellaneous gas discharge line for discharging desorbed miscellaneous gas that has been adsorbed on the adsorbent; and perform an PSA operation of alternately performing, with the adsorption tower, the source gas supply line, the product gas recovery line, and the miscellaneous gas discharge line, an adsorption step of receiving the source gas into the adsorption tower from the source gas supply line, adsorbing the miscellaneous gas onto the adsorbent, and recovering the product gas into the product gas recovery line, and a desorption step of depressurizing-desorbing the miscellaneous gas adsorbed on the adsorbent and discharging that miscellaneous gas from the miscellaneous gas discharge line in a state in which the source gas supply line and the product gas recovery line are closed.

By such a control, the changes in the internal pressures of the adsorption towers A1 to A4 transition as shown in FIG. 2.

More specifically, the adsorption tower A1 is controlled according to the following steps. Although the same operation is also performed for the other adsorption towers A2 to A4 in a phase shifting manner, the detailed description thereof has been omitted and replaced by the description with reference to FIGS. 2 and 3 to avoid redundancy. Note that the adsorption towers A1 to A4 are referred to as first to fourth adsorption towers A1 to A4 in this order. FIGS. 2 and 3 show the operating state of the open/close valves and the like in the steps. The number written in < > denotes the step number in FIGS. 2 and 3. The operating conditions specifically described below are merely illustrative, and the present invention is not limited by the following specific examples.

<1> Pre-Parallel Adsorption Step

As shown in FIGS. 2 and 3, a coal mine gas as the source gas is introduced into the first adsorption tower A1 from the source gas tank T1. At this time, the pressure in the first adsorption tower A1 is increased by the supply pressure of the source gas. Further, while the air as the miscellaneous gas in the coal mine gas supplied from the source gas tank T1 via the switching valve V11 of the supply line L11 is adsorbed onto the adsorbent A11, any non-adsorbed methane is recovered as the product gas into the product gas tank T2 via the switching valve V12 of the recovery line L12.

Here, in the initial stage of the adsorption step, the adsorption step of the first adsorption tower A1 is started to gradually increase the internal pressure of the first adsorption tower A1, concurrently with a gradually reduction of the internal pressure of the fourth adsorption tower A4 in the final stage of the adsorption step of the fourth adsorption tower A4. That is, prior to the start of the adsorption step of the first adsorption tower A1, the pre-parallel adsorption step is performed in the first adsorption tower A1 together with the post-parallel adsorption step of the fourth adsorption tower A4.

At this time, the second adsorption tower A2 is in the standby step, and the desorption step has been started in the third adsorption tower A3.

<2 to 4> Adsorption Step

As shown in FIGS. 2 and 3, following the pre-parallel adsorption step, the coal mine gas is introduced into the first adsorption tower A1 from the source gas tank T1. At this time, the pressure in the first adsorption tower A1 is further increased by the supply pressure of the source gas. Also, while the air is adsorbed onto the adsorbent A11 via the switching valve V11 of the supply line L11, methane is recovered into the product gas tank T2.

At this time, the second adsorption tower A2 performs <2> the final pressure equalization (pressurizing) step, and transitions to <3 to 4> the pressurizing step.

Also, the third adsorption tower A3 performs <3> the washing step and <4> the initial pressure equalization (pressurizing) step, following <2> the desorption step.

Furthermore, the fourth adsorption tower A4 performs <2> the initial pressure equalization (depressurizing), and transitions to <4> the final pressure equalization (depressurizing) step, with <3> the standby step in between.

The methane purity in the product gas at this time can be set by setting the time or the like of the adsorption step, and can be set to 90% or more. For example, in the case of using a cylindrical (inside diameter: 54 mm, volume: 5.7 L) adsorption tower A1, and treating a source gas containing 60% methane and 50% nitrogen at 12 NL/min, a product gas having a methane concentration of 95%, a nitrogen concentration of 5%, and a pressure of about 0.7 MPaG was successfully recovered into the product gas tank T2 when the adsorption step was performed for about 90 seconds with the supply pressure by the supply pump P1 set at about 0.7 MPaG. Note that the adsorption tower A1 is filled with the adsorbent C having a particle diameter of 1.8 mmφ with a packing density of 0.69 g/mL.

<5> Post-Parallel Adsorption Step

In the final stage of the adsorption step of the first adsorption tower A1, the post-parallel adsorption step of performing the adsorption step in parallel with the pre-parallel adsorption step in the second adsorption tower A2 in the initial stage of the adsorption step is performed. That is, the supply amount of the coal mine gas in the adsorption step and the supply amount of the coal mine gas to the first and second adsorption towers A1 and A2 in the present step are the same, and therefore, in the present step, each of the supply amounts of the coal mine gas to the first and second adsorption towers A1 and A2 is set to be smaller than the supply amount of coal mine gas in the adsorption step. Accordingly, as shown in FIGS. 2 and 3, in the present step, by reducing the adsorption flow rate in the final stage of the adsorption step, the environmental change in the adsorption tower can be suppressed so as to proceed gradually, and it is possible to stabilize the coal mine gas flow in the adsorption tower A1, inhibit the generation of a turbulent flow in the adsorption tower A1, and cause the adsorbent A11 to act in a stable manner.

Note that at this time, the third adsorption tower A3 performs the standby step, and the fourth adsorption tower A4 performs the desorption step.

<6> Initial Pressure Equalization (Depressurizing) Step

The first adsorption tower A1 that has finished the adsorption step performs the initial pressure equalization (depressurizing) step between itself and the third adsorption tower A3 that performs the final pressure equalization (pressurizing) step. That is, as shown in FIGS. 2 and 3, non-adsorbed gas in the tower is discharged via the switching valve V17 of the pressure equalization line L17, and is transferred to the third adsorption tower A3 via a switching valve V37. Consequently, as shown in FIG. 2, pressure equalization is performed between the first adsorption tower A1 and the third adsorption tower A3 in the low pressure-side intermediate pressure state.

Note that at this time, the second adsorption tower A2 performs the adsorption step, and the fourth adsorption tower A4 performs the desorption step.

<7> Standby Step

Next, the first adsorption tower A1 enters the standby state, and the high pressure-side intermediate pressure state is maintained.

At this time, the second adsorption tower A2 performs the adsorption step, the third adsorption tower A3 transitions to the pressurizing step, and the fourth adsorption tower A4 transitions to the washing step.

<8> Final Pressure Equalization (Depressurizing) Step

Next, as shown in FIGS. 2 and 3, the first adsorption tower A1 performs a final pressure equalization (depressurizing) step between itself and the fourth adsorption tower A4 that has finished the desorption step and performs the initial pressure equalization (pressurizing) step. That is, any non-adsorbed gas in the tower and the miscellaneous gas that starts to desorb initially from the adsorbent A11 are discharged via the switching valve V17 of the pressure equalization line L17, and are transferred to the fourth adsorption tower A4 via a switching valve V47. Consequently, pressure equalization is performed between the first adsorption tower A1 and the fourth adsorption tower A4 that has finished the desorption step and is in the low pressure state.

Note that at this time, the second adsorption tower A2 performs the adsorption step, and the third adsorption tower A3 performs the pressurizing step.

<9 to 10> Desorption Step

As shown in FIGS. 2 and 3, the first adsorption tower A1 that has reached the low pressure-side intermediate pressure state is in a state in which a high-concentration miscellaneous gas is adsorbed on the adsorbent A11 in the tower, and the high-concentration miscellaneous gas adsorbed on the adsorbent A11 is recovered by performing a desorption step of decompressing the inside of the tower from the low pressure-side intermediate pressure state to the low pressure state using a vacuum pump P3. That is, the concentrated miscellaneous gas is recovered via the switching valve V13 of the exhaust gas line L13.

Note that at this time, after performing <9> the post-parallel adsorption step in parallel with the third adsorption tower A3, the second adsorption tower A2 performs <10> the initial pressure equalization (depressurizing) step between itself and the fourth adsorption tower A4.

In the third adsorption tower A3, after <9> the pre-parallel adsorption step is performed in parallel with the second adsorption tower A2, <10> the adsorption step is performed.

After <9> the standby step, the fourth adsorption tower A4 performs <10> the final pressure equalization (pressurizing) step between itself and the second adsorption tower A2.

<11> Washing Step

As shown in FIGS. 2 and 3, the first adsorption tower A1 that has transitioned to the low pressure displacement washes the gas in the tower into a gas composed mainly of methane by causing the product gas to flow into the tower. That is, the open/close valve Vo4 of the product gas washing line L4 is opened, and the needle valve Vn4 is adjusted, the product gas is flowed into the first adsorption tower A1 from the product gas tank T2 through the switching valve V14 of the washing line L14 so as to cause the internal pressure of the product gas tank T2 to act gently on the adsorption tower A1, thereby replacing the atmosphere in the first adsorption tower A1 with methane, and the gas remaining in the first adsorption tower A1 is released as an exhaust gas into the miscellaneous gas discharge line L3 via the switching valve V13 of the exhaust gas line L13.

Note that at this time, the second adsorption tower A2 is in the standby step, and the third adsorption tower A3 continues the adsorption step. In addition, the fourth adsorption tower A4 performs the pressurizing step.

<12> Initial Pressure Equalization (Pressurizing) Step

As shown in FIGS. 2 and 3, the first adsorption tower A1, which has entered the low pressure state and has released the adsorbed air and in which the adsorbent A11 has been regenerated, performs an initial pressure equalization (pressurizing) step between itself and the second adsorption tower A2, thereby restoring the pressure in the tower and receiving an exhaust gas discharged in the final pressure equalization (depressurizing) step in the second adsorption tower A2, the exhaust gas containing methane due to the initially desorbed gas from the adsorbent A21. That is, the tower gas discharged from the second adsorption tower A2 in the high pressure-side intermediate pressure state via the switching valve V27 in the pressure equalization line L27 is received in the inter-tower pressure equalization line L7 via the switching valve V14 in the washing line L14. Consequently, as shown in FIG. 2, the first adsorption tower A1 restores its pressure from the low pressure state to the low pressure-side intermediate pressure state.

Note that at this time, the third adsorption tower A3 continues the adsorption step, and the fourth adsorption tower A4 performs the pressurizing step.

<13> Standby Step

Next, as shown in FIGS. 2 and 3, the first adsorption tower A1 enters the standby state, and the high pressure-side intermediate pressure state is maintained.

At this time, the second adsorption tower A2 performs the desorption step, and the third adsorption tower A3 transitions to the post-parallel adsorption step and the fourth adsorption tower A4 transitions to the pre-parallel adsorption step.

<14> Final Pressure Equalization (Pressurizing) Step

As shown in FIGS. 2 and 3, the first adsorption tower A1 that has restored its pressure to the low pressure-side intermediate pressure state attempts to further restore the pressure in the tower by subsequently performing a final pressure equalization (pressurizing) step between itself and the third adsorption tower A3 that performs the adsorption step immediately after finishing the initial pressure equalization (depressurizing) step. That is, the gas in the tower discharged from the third adsorption tower A3 in the high pressure state is received in the pressure equalization lines L17 to L37 of the inter-tower pressure equalization line L7 via the switching valves V17 and V37. Consequently, as shown in FIG. 2, the first adsorption tower A1 restores its pressure from the low pressure-side intermediate pressure state to the high pressure-side intermediate pressure state.

Note that at this time, the second adsorption tower A2 performs the desorption step, and the fourth adsorption tower A4 performs the adsorption step.

<15 to 16> Pressurizing Step

As shown in FIG. 2, the pressure of the first adsorption tower A1 that has restored its pressure to the high pressure-side intermediate pressure state is restored to the high pressure state by injection of the product gas. Consequently, the inside of the first adsorption tower A1 is restored to the high pressure state, and regenerated by supply of a coal mine gas into a high pressure state capable of adsorbing the air contained in the coal mine gas.

Note that at this time, the second adsorption tower A2 performs <16> the initial pressure equalization (pressurizing) step between itself and the third adsorption tower A3, following <15> the washing step. The third adsorption tower A3 performs, after <15> the standby step, <16> the final pressure equalization (depressurizing) step between itself and the second adsorption tower A2. The fourth adsorption tower A4 performs the adsorption step.

Note that at this time, with the open/close valves and the like being operated as shown in FIGS. 2 and 3, the second adsorption tower A2 performs the initial pressure equalization (pressurizing) step, and the third adsorption tower A3 performs the final pressure equalization (depressurizing) step, and thereby, they perform pressure equalization with each other.

(Alternative Embodiments)

(1) The above-described gas purification apparatus may be provided with a pressure sensor, a temperature sensor, and the like, as appropriate. Specifically, a pressure sensor and a gas sensor for monitoring the supply pressure of the source gas and the methane concentration of the product gas are usually provided, but the detailed description thereof has been omitted in the above-described embodiment.

Figure 7:
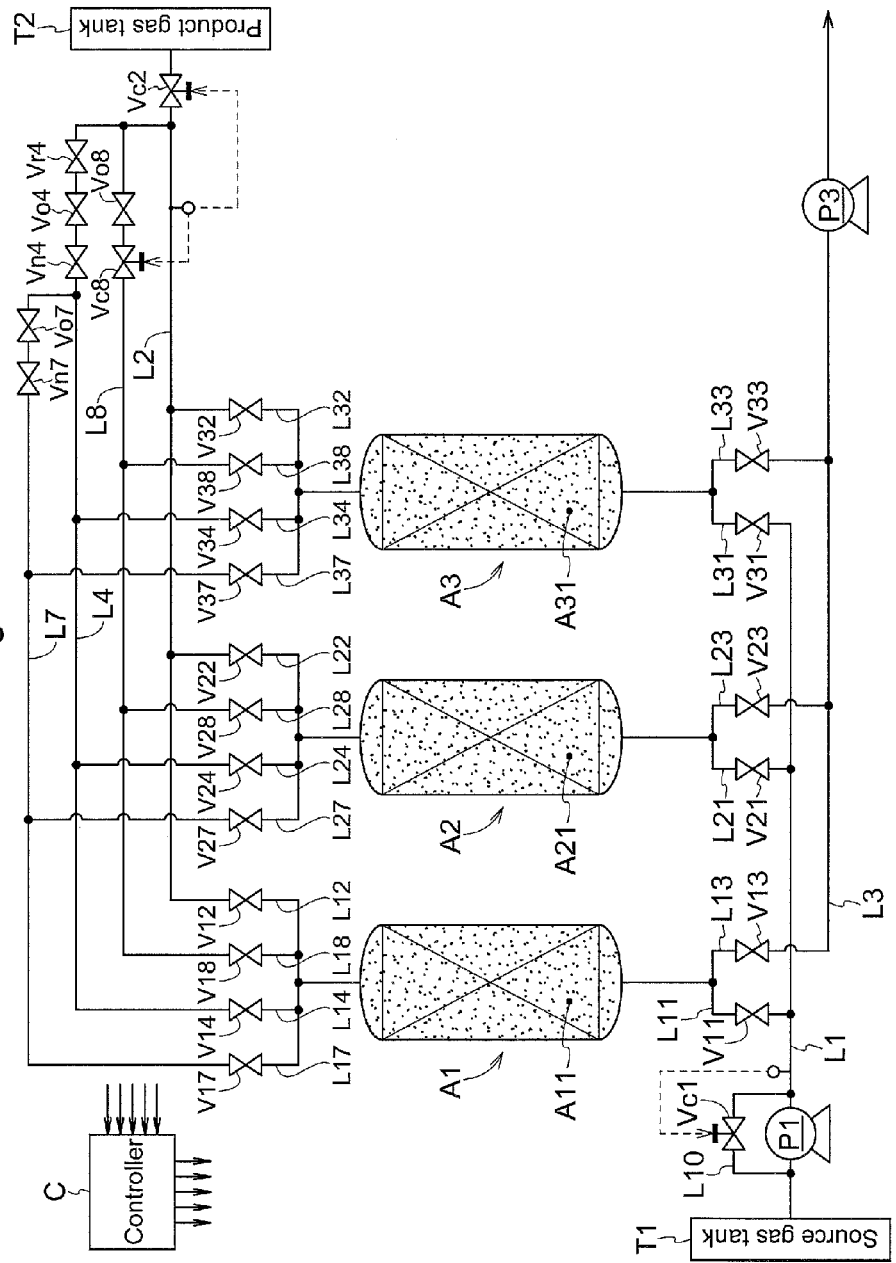
FIG. 7 is a schematic diagram of a gas purification apparatus according to Alternative Embodiment (2).
Figure 8:
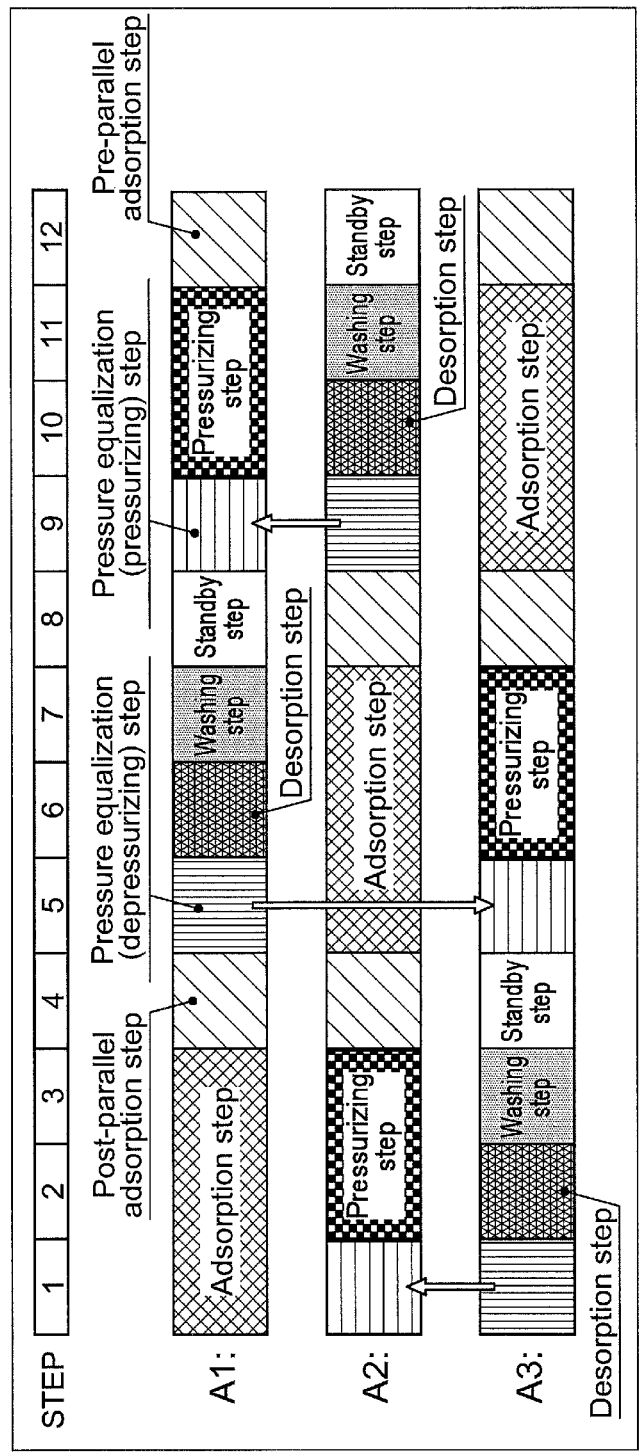
FIG. 8 is a step diagram showing a methane concentration method according to Alternative Embodiment (2).

(2) The PSA cycle is not limited to the one described above as long as it is configured such that the adsorption towers can be continuously used in an effective manner, and various modifications may be made. For example, in the case of the gas purification apparatus having the above-described configuration shown in FIG. 7, it is possible to perform an operation method in accordance with FIG. 8.

(3) Although an example is shown in which the gas purification method in the above-described embodiment is used for purification of a coal mine gas, the gas purification method can be used in the case of concentrating gases other than a coal mine gas that contain methane at the same level as a coal mine gas, such as a biogas, and also can be used for uses in which purification is achieved by adsorbing a miscellaneous gas other than a purification target gas from the source gas. At this time, the adsorbent can be changed as appropriate in accordance with the types and the concentrations of the purification target gas and the miscellaneous gas.

(4) Further, when a coal mine gas is used as a source gas, there is a case where the concentration of methane is low and a sufficient purification efficiency is thus not likely to be exerted, and therefore, prior to performing the gas purification method, a low-concentration methane-containing gas having a methane concentration of less than 50% is used as an upstream source gas, an upstream adsorption tower filled with a methane adsorbent that adsorbs methane from the upstream source gas is provided, an upstream source gas supply line for supplying the upstream source gas to the upstream adsorption tower is provided, an upstream miscellaneous gas discharge line for discharging an upstream miscellaneous gas that has not been adsorbed on the methane adsorbent is provided, an upstream gas recovery line for recovering desorbed methane that has been adsorbed on the methane adsorbent is provided, and the upstream adsorption tower, the upstream source gas supply line, the upstream miscellaneous gas discharge line, and the upstream gas recovery line are used to alternately perform an upstream adsorption step of receiving the upstream source gas from the upstream source gas supply line, adsorbing methane onto the methane adsorbent, and discharging the upstream miscellaneous gas that has not been adsorbed on the methane adsorbent, and an upstream desorption step of desorbing methane adsorbed on the methane adsorbent and recovering that methane from the upstream gas recovery line, with the upstream source gas supply line and the upstream miscellaneous gas discharge line being closed, thereby obtaining a gas recovered from the upstream gas recovery line as a source gas having a methane concentration of 40% or more and 70% or less.

Figure 9:
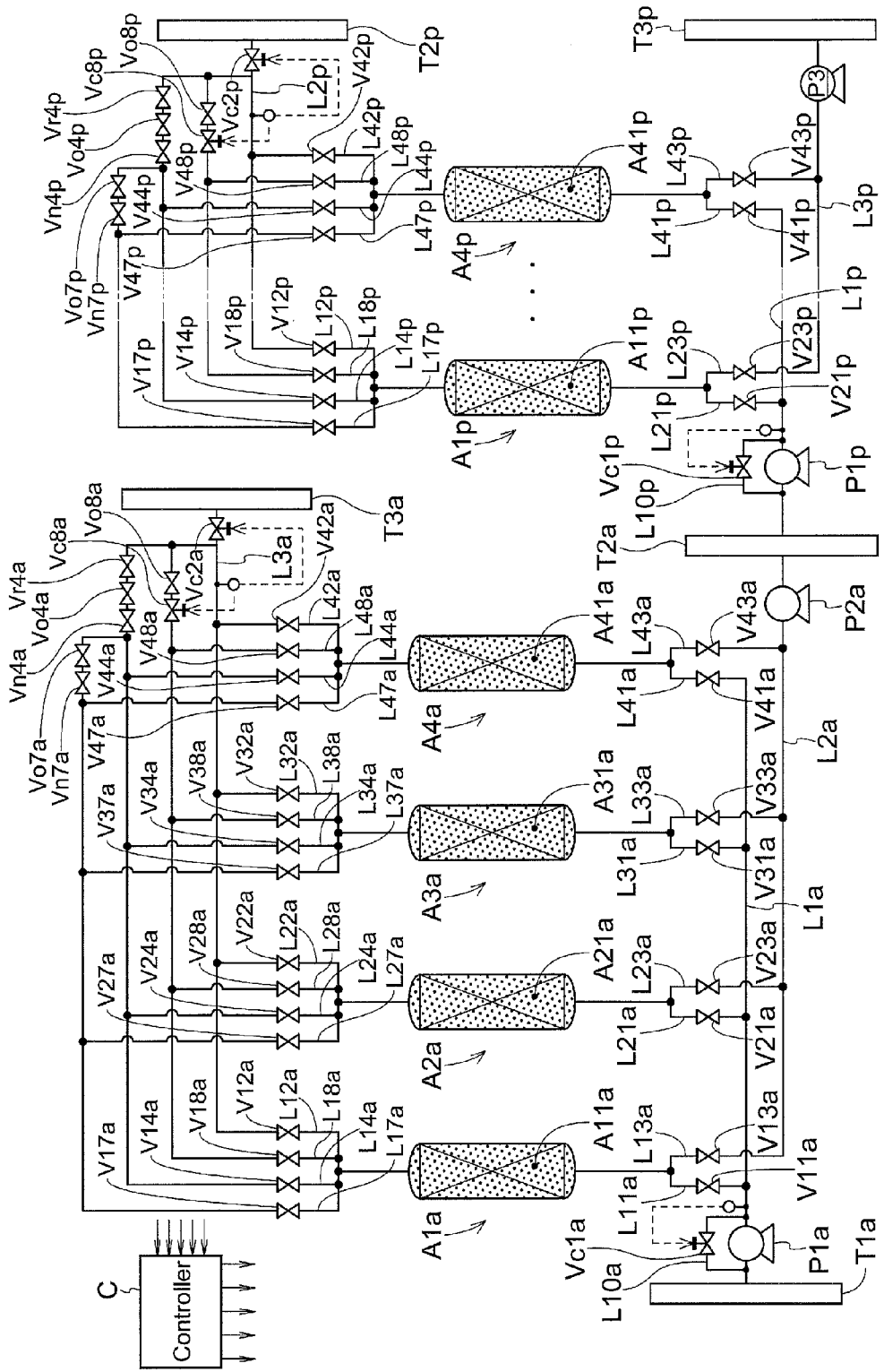
FIG. 9 is a schematic diagram of a gas purification apparatus according to Alternative Embodiment (4).

That is, it is possible to adopt a configuration as shown in FIG. 9.

In FIG. 9, in addition to using the above-described gas purification apparatus as the downstream gas purification apparatus, a PSA device is used as the upstream gas purification apparatus, the PSA apparatus having a configuration in which the adsorbents A11a to A41a in the downstream gas purification apparatus are changed to methane adsorbents and the function of the downstream product gas recovery line L2p and the function of the downstream miscellaneous gas discharge line L3p in the downstream gas purification apparatus are interchanged, and, the upstream desorption step of desorbing methane adsorbed on the adsorbents A11a to A41a and recovering the methane from the upstream product gas recovery line L2a, with the upstream source gas supply line L1a and the upstream miscellaneous gas discharge line L3a being closed, is performed in an alternate manner, and the gas recovered from the upstream product gas recovery line L2a is supplied to the downstream gas purification apparatus as a source gas having a methane concentration of 40% or more and 70% or less.

Note that in FIG. 9, the portions having the same functions as the corresponding portions of the gas purification apparatus of FIG. 1 are denoted by the same numerals as the gas purification apparatus of FIG. 1, with "a" added to the numerals in the upstream gas purification apparatus and "p" added to the numerals in the downstream gas purification apparatus, and the detailed description thereof has been omitted. Note, however, that the upstream gas purification apparatus and the downstream gas purification apparatus are different in that the downstream product gas recovery line L2p is connected to the upper portion of the adsorption towers A1p to A4p and the downstream miscellaneous gas discharge line L3p is connected to the lower portion of the adsorption towers A1p to A4p in the downstream gas purification apparatus, whereas the upstream product gas recovery line L2a is connected to the lower portion of the adsorption towers A1a to A4a and the upstream miscellaneous gas discharge line L3a is connected to the upper portion of the adsorption towers A1a to A4a in the upstream gas purification apparatus.

As the methane adsorbent used in such a configuration, it is preferable to use a methane gas adsorbent 21a that is at least one selected from the group consisting of an activated carbon, zeolite, silica gel, and an organic metal complex (e.g., copper fumarate, copper terephthalate, copper cyclohexane dicarboxylate) having an average pore diameter of 4.5 to 15 Å as measured by the MP method and having a methane gas adsorption amount under atmospheric pressure and 298 K of 20 Nml/g or more.

Such an adsorbent has the properties of selectively adsorbing a methane gas contained in the source gas in a high pressure state near atmospheric pressure, and desorbing the adsorbed methane gas in a low pressure state lower than atmospheric pressure.

In the adsorption towers A1a to A4a, the controller C controls the switching valves V11a to V45a and the pumps P1a and P2a in the upstream gas purification apparatus to perform the following steps in order:

an adsorption step of receiving supply of a methane gas in a high pressure state near atmospheric pressure from the lower portion of the adsorption towers A1a to A4a, adsorbing the methane gas onto the adsorbents A11a to A41a, and releasing an offgas composed mainly of the air from the upper portion of the adsorption towers A1a to A4a;

an initial pressure equalization (depressurizing) step of transferring a gas having a relatively low methane concentration in one of the adsorption towers A1a to A4a that is in a high pressure state to another one of the adsorption towers A1a to A4a that is in an intermediate pressure state at a pressure lower than that in the one of the adsorption towers A1a to A4a so as to bring the pressure in the one of the adsorption towers A1a to A4a into a high pressure-side intermediate pressure state;

a standby step;

a final pressure equalization (depressurizing) step of transferring a gas in which the methane concentration has been slightly increased than that in the initial pressure equalization (depressurizing) step in one of the adsorption towers A1a to A4a that is in an intermediate pressure state at a pressure higher than that of the low pressure state to another one of the adsorption towers A1a to A4a that is in a low pressure state so as to bring the pressure in the one of the adsorption towers A1a to A4a into a low pressure-side intermediate pressure state;

after the tower pressure has been reduced by the pressure equalization (depressurizing) step, a decompression step of further reducing the pressure in the one of the adsorbents A11a to A41a into a low pressure state to desorb the methane gas adsorbed on the one of the adsorbents A11a to A41a and recovering the methane gas from the lower portion of the one of the adsorption towers A1a to A4a;

an initial pressure equalization (pressurizing) step of receiving, into the one of the adsorption towers A1a to A4a in the low pressure state, the gas in the other one of the adsorption towers A1a to A4a in the high pressure-side intermediate pressure state so as to bring the pressure in the one of the adsorption towers A1a to A4a into the low pressure-side intermediate pressure state;

a final pressure equalization (pressurizing) step of receiving, into the one of the adsorption towers A1a to A4a that is in the low pressure-side intermediate pressure state, the gas in another one of the adsorption towers A1a to A4a that is in the high pressure state so as to bring the pressure in the one of the adsorption towers A1a to A4a into the high pressure-side intermediate pressure state;

the standby step; and, after the tower pressure has been increased by the pressure equalization (pressurizing) step, a pressurizing step of further supplying a pressurizing air into the one of the adsorption towers A1a to A4a from the upper portion of another one of the adsorption towers A1a to A4a so as to restore the corresponding one of the adsorbents A11a to A41a into the high pressure state in which methane can be selectively adsorbed.

Since this makes it possible to collect a gas having a methane concentration of about 50 to 70% from a source gas containing, for example, 20% or more and 40% or less of methane in the upstream gas purification apparatus, the gas purification method of the present invention can be performed even on a coal mine gas having a relatively low methane concentration in the downstream gas purification apparatus by using a gas in which methane has been concentrated to a certain degree in the upstream gas purification apparatus as the source gas, and therefore, it is possible to recover a high-concentration methane in a highly efficient manner. This enables the gas purification method of the present invention to be applied to source gases having a wide range of methane concentrations.

Figure 10:
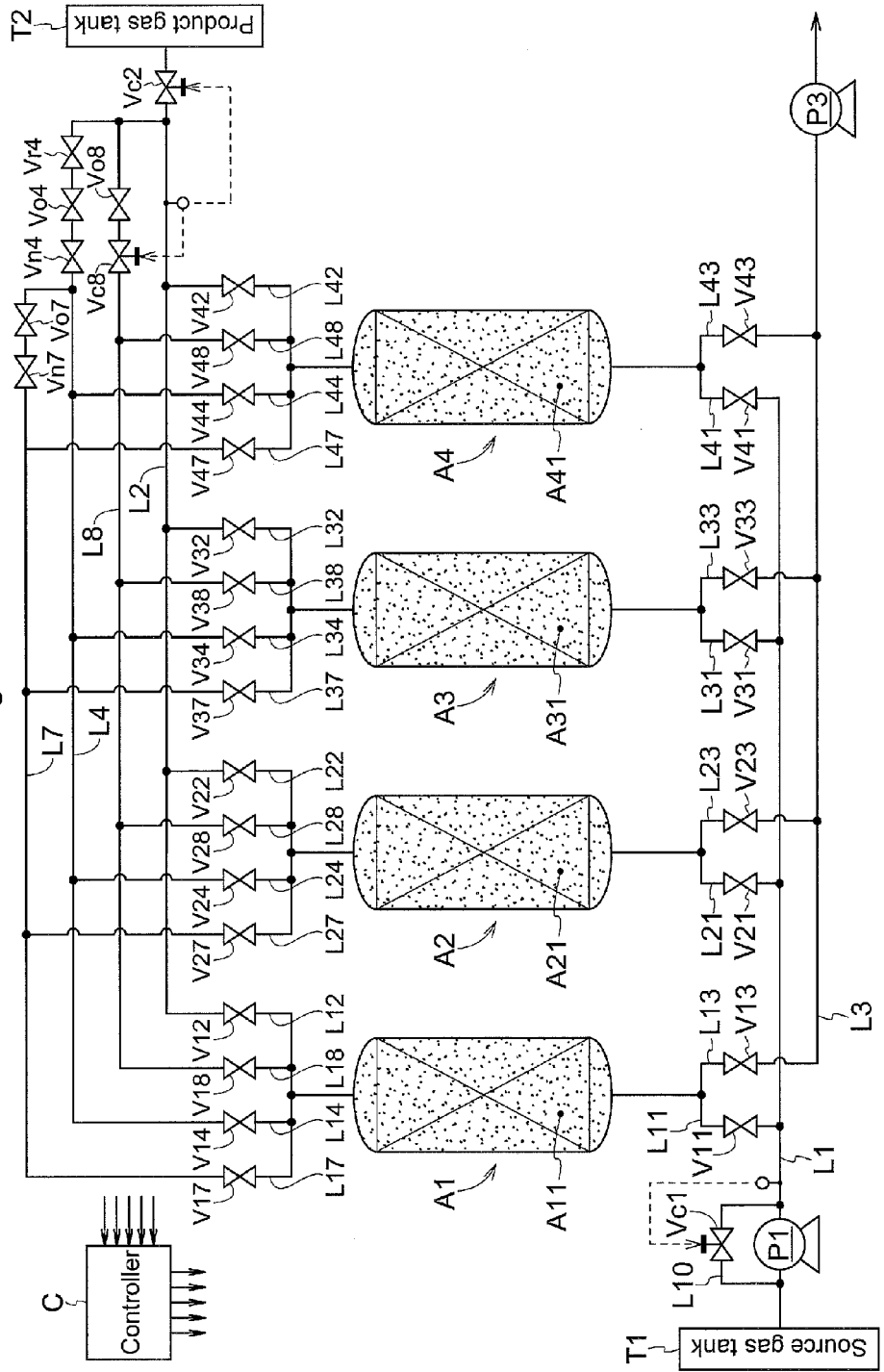
FIG. 10 is a schematic diagram of a gas purification apparatus according to Alternative Embodiment (5).

(5) Although the washing step is performed with a product gas pressure in the above-described gas purification apparatus, it is possible to adopt a configuration in which decompression generation is performed with a vacuum pump P3. That is, it is possible to adopt a configuration as shown in FIG. 10. With this configuration, the washing step with the product gas need not be performed in the case of discharging gas from the miscellaneous gas discharge line L3 by using the vacuum pump P3, as a result of which the amount of the product gas is increased, thus advantageously increasing the recovery rate.

Figure 11:
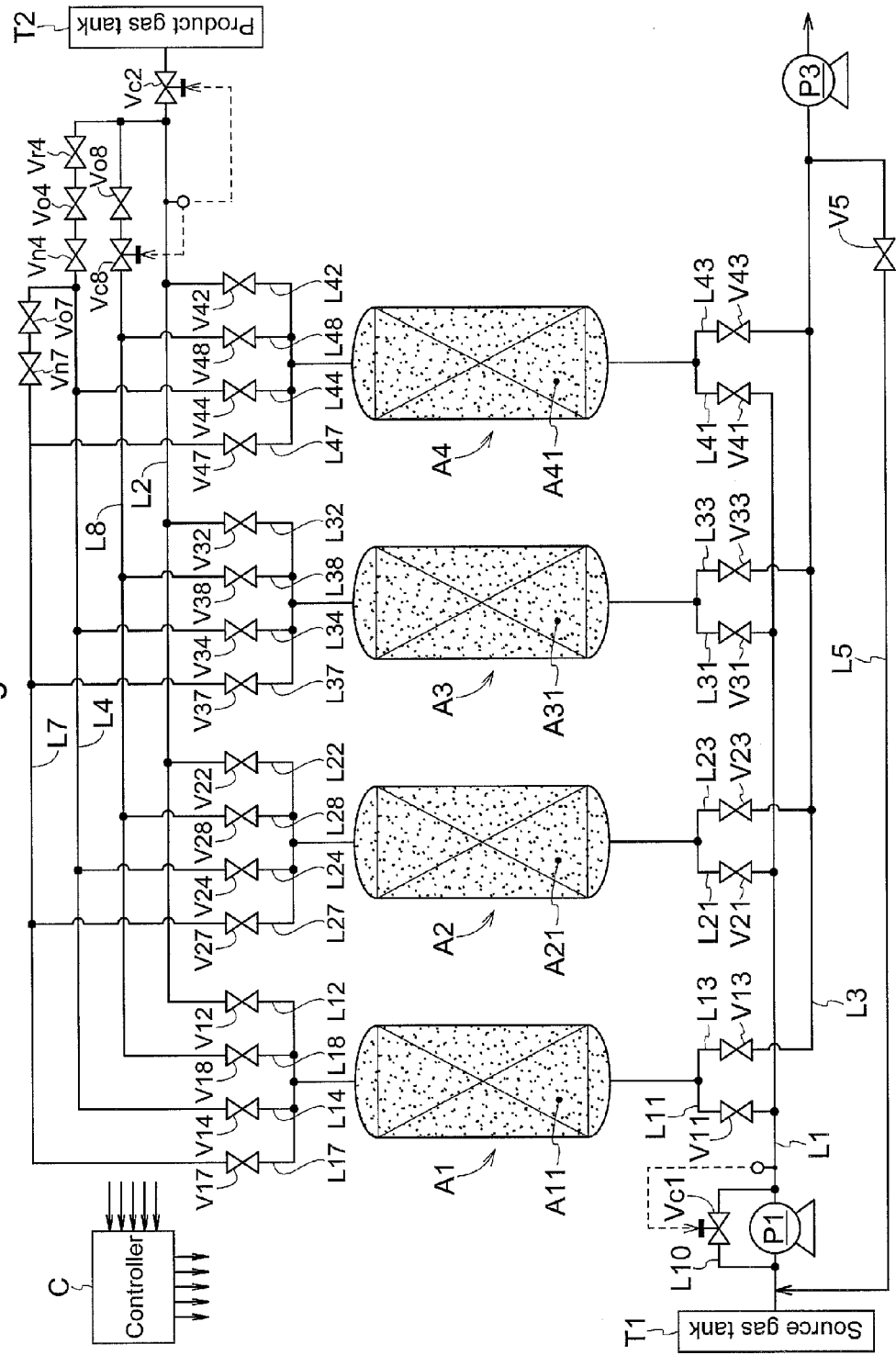
FIG. 11 is a schematic diagram of a gas purification apparatus according to Alternative Embodiment (6).

(6) The above-described embodiment is configured to discharge the exhaust gas in the desorption and washing steps from the miscellaneous gas discharge line L3. However, since a part of the exhaust gas generated during the desorption and washing steps contains a high-concentration methane, it is possible to provide a recycle line L5 including a switching valve V5 or the like as shown in FIG. 11 so as to recycle this exhaust gas as the source gas again, thus improving the recovery efficiency.

(7) In the above-described embodiment, a description is given of an example in which, as the adsorbents A11 to A41,
a carbon molecular sieve having a pore volume ($V_{0.38}$), at a pore diameter of 0.38 nm or more, of not exceeding 0.05 cm$^3$/g and a pore volume ($V_{0.34}$), at a pore diameter of 0.34 nm, of 0.15 cm$^3$/g or more in the pore diameter distribution as measured by the MP method is used.

However, as the adsorbents A11 to A41, it is also possible to use a carbon molecular sieve having a pore volume ($V_{0.38}$), at a pore diameter of 0.38 nm or more, of not exceeding 0.01 cm$^3$/g and a pore volume ($V_{0.34}$), at a pore diameter of 0.34 nm, of 0.20 cm$^3$/g or more in the pore diameter distribution as measured by the MP method. Examples of such an adsorbent include adsorbents A to C, and F as shown in FIG. 4.

Note that as shown in FIG. 5, in the adsorbent C, the methane adsorption amount at the point in time at which the nitrogen adsorption amount has reached equilibrium is about 40% of the equilibrium adsorption amount. In contrast, although not shown, in the adsorbent G, the methane adsorption amount at the point in time at which the nitrogen adsorption amount has reached equilibrium reaches about 60% of the equilibrium adsorption amount.

That is, it can be seen that in the adsorbent C, there is a significant difference between the time at which the adsorption of the miscellaneous gas mainly occurs and the time at which the adsorption of methane mainly occurs, and therefore, it takes a relatively long time for the methane adsorption capability to be exerted, whereas, in the adsorbent G, there is a small difference between the above-described two times, and therefore the methane adsorption capability is exerted in a relatively short time.

INDUSTRIAL APPLICABILITY

According to the present invention, it is possible to improve the product recovery rate from a gas purification apparatus that uses a PSA device, and provide a gas purification apparatus that achieves both a high purity and a high recovery rate with good power efficiency.

DESCRIPTION OF REFERENCE SIGNS

A1 to A4: First to fourth adsorption towers
A11 to A41: Adsorbents
C: Controller
L1: Source gas supply line
L2: Product gas recovery line
L3: Miscellaneous gas discharge line
L4: Product gas washing line
L7: Inter-tower pressure equalization line
L8: Product gas pressurizing line
L9: Regenerated gas recovery line
L10, L30: Bypass lines
L11 to L41: Supply lines
L12 to L42: Recovery lines
L13 to L43: Exhaust gas lines
L14 to L44: Washing lines
L17 to L47: Pressure equalization lines
L18 to L48: Pressurizing lines
P1: Supply pump
P2: Pump
P3: Vacuum pump
T1: Source gas tank
T2: Product gas tank
T5: Regenerated gas tank
V11 to V44: Switching valves
Vc1 to Vc8: Pressure control valves
Vn4, Vn7: Needle valves
Vo3 to Vo8: Open/close valves
Vr4: Pressure reducing valve

The invention claimed is:

1. A gas purification method comprising:
providing an adsorption tower filled with an adsorbent that adsorbs a miscellaneous gas comprising at least nitrogen and oxygen from a source gas containing methane;
providing a source gas supply line for supplying the source gas to the adsorption tower;
providing a product gas recovery line for discharging methane that has not been adsorbed on the adsorbent as a product gas;
providing a miscellaneous gas discharge line for discharging desorbed miscellaneous gas that has been adsorbed on the adsorbent; and
alternately performing, with the adsorption tower, the source gas supply line, the product gas recovery line, and the miscellaneous gas discharge line,
an adsorption step of receiving the source gas into the adsorption tower from the source gas supply line, adsorbing the miscellaneous gas onto the adsorbent, and recovering the product gas into the product gas recovery line, and
a desorption step of depressurizing-desorbing the miscellaneous gas adsorbed on the adsorbent and discharging said miscellaneous gas from the miscellaneous gas discharge line in a state in which the source gas supply line and the product gas recovery line are closed,
wherein a carbon molecular sieve having
a pore volume ($V_{0.38}$), at a pore diameter of 0.38 nm or more, of not exceeding 0.05 cm$^3$/g and
a pore volume ($V_{0.34}$), at a pore diameter of 0.34 nm, of 0.15 cm$^3$/g or more, in a pore diameter distribution measured by the MP method is used as the adsorbent, and,
in the adsorption step, the miscellaneous gas is adsorbed from the source gas by bringing the source gas into contact with the adsorbent for 10 seconds or more and 6000 seconds or less so as to obtain a concentrated methane.

2. The gas purification method according to claim 1, wherein the adsorbent has a pore volume ($V_{0.38}$), at a pore diameter of 0.38 nm or more, of not exceeding 0.01 cm$^3$/g and a pore volume ($V_{0.34}$), at a pore diameter of 0.34 nm, of 0.20 cm$^3$/g or more.

3. The gas purification method according to claim 1, wherein the adsorbent has a particle diameter of 0.5 mmφ to 3.0 mmφ, and a packing density of the adsorbent for the adsorption tower is 0.60 g/mL to 0.75 g/mL.

4. The gas purification method according to claim 1, comprising:
prior to performing said gas purification method,
using a low-concentration methane-containing gas having a methane concentration of less than 50% as an upstream source gas;
providing an upstream adsorption tower filled with a methane adsorbent that adsorbs methane from the upstream source gas;
providing an upstream source gas supply line for supplying the upstream source gas to the upstream adsorption tower;
providing an upstream miscellaneous gas discharge line for discharging an upstream miscellaneous gas that has not been adsorbed on the methane adsorbent;
providing an upstream gas recovery line for recovering desorbed methane that has been adsorbed on the methane adsorbent; and
alternately performing, with the upstream adsorption tower, the upstream source gas supply line, the upstream miscellaneous gas discharge line, and the upstream gas recovery line,
an upstream adsorption step of receiving the upstream source gas from the upstream source gas supply line, adsorbing methane onto the methane adsorbent, and discharging the upstream miscellaneous gas that has not been adsorbed on the methane adsorbent; and
an upstream desorption step of desorbing methane adsorbed on the methane adsorbent and recovering said methane from the upstream gas recovery line, with the upstream source gas supply line and the upstream miscellaneous gas discharge line being closed, thereby obtaining a gas recovered from the upstream gas recovery line as a source gas having a methane concentration of 50% or more.

* * * * *